Feb. 9, 1960     M. J. FULTON     2,924,336
LIQUID DISPERSION SEPARATING DEVICE
Filed April 29, 1958
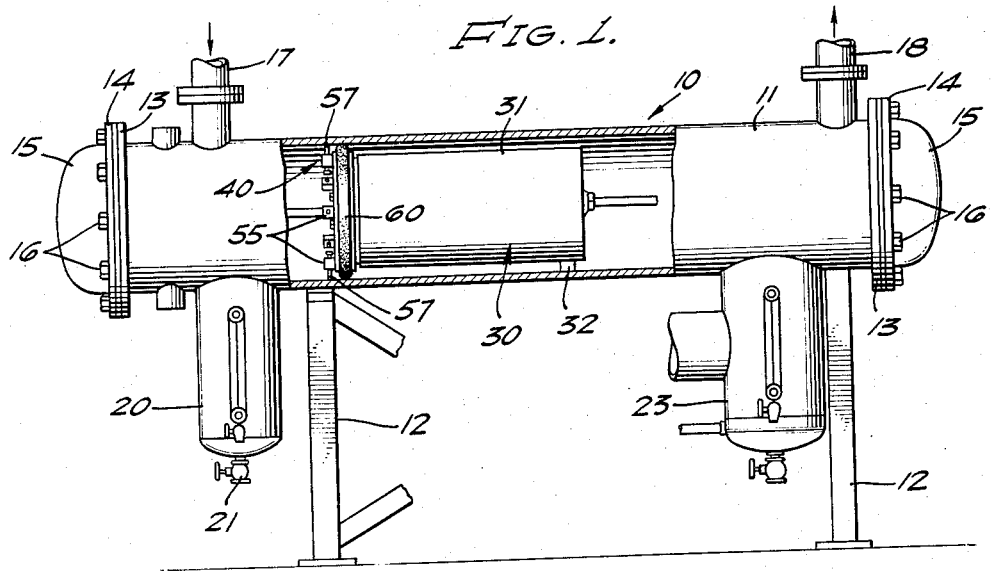
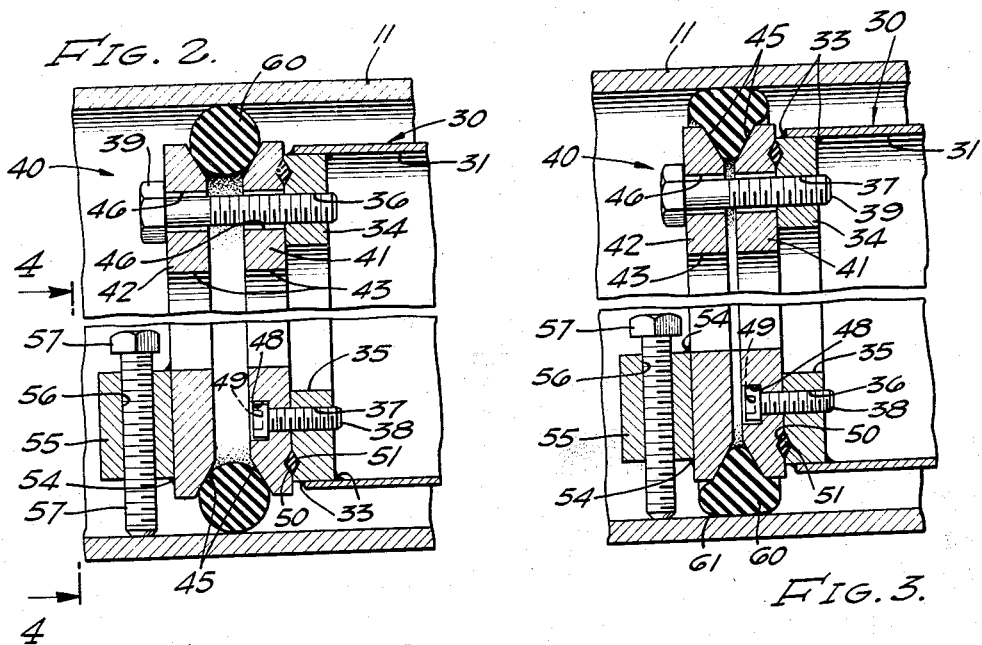
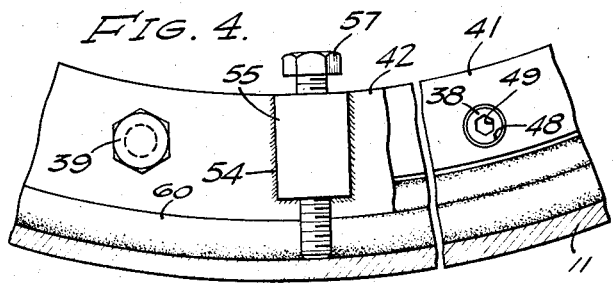
MERVIN J. FULTON
INVENTOR.
BY
ATTORNEY

United States Patent Office 2,924,336
Patented Feb. 9, 1960

2,924,336

LIQUID DISPERSION SEPARATING DEVICE

Mervin J. Fulton, Tulare, Calif.; Leota Williamson Fulton, executrix of said Mervin J. Fulton, deceased Application April 29, 1958, Serial No. 731,670

3 Claims. (Cl. 210—450)

This invention relates to liquid dispersion separating devices, and more particularly to an improved filter cartridge featuring an improved detachable coupling and seal assembly for use in mounting the cartridge in fluid-tight relation to an enclosing housing therefor.

The subject matter of the present invention deals with the type of liquid separating device and filter cartridge disclosed in the co-pending application for United States Letters Patent, Serial No. 646,251, filed March 15, 1957, now Patent No. 2,858,027 by Mervin J. Fulton and Thomas J. Fulton, entitled Liquid Dispersion Separating Device.

The filter cartridges there disclosed and with which the present invention is used, are of a type having a gross weight of approximately 150 pounds and an outer diameter of approximately two feet. These filters are commonly housed intermediate the ends of a long, generally horizontally disposed cylindrical housing having a relatively smooth internal bore lacking grooves, flanges and the like for rigidly supporting the filter cartridge, the filter cartridge being accessible for servicing and replacement through the removable end cap of the cylinder. The problem presented is that of providing a fluid-tight seal and anchorage connector between the filter cartridge and the bore of the housing which anchorage can be expanded and contracted remotely through the open end of the housing. Owing to the very considerable pressure differential across the filter in normal operation, the anchorage coupling provided must be capable of withstanding high shear stresses and holding the filter cartridge against displacement axially of the housing, as well as being effective in preventing leakage therepast.

The combined sealing and mounting assembly for such filter cartridge applications as heretofore provided have been permanently attached to the filter cartridge with the result that these costly mounting assemblies had to be discarded along with the cartridge when the filter became too clogged for further use. According to the present invention, the mounting ring and sealing assembly is so constructed as to be readily detachable from an unserviceable filter and attached to a new filter for reuse in mounting the operating environment. Accordingly, and by the expedients herein disclosed, the mounting and sealing assembly of the present invention is reusable repeatedly throughout the service lives of many filter cartridges. In fact, the mounting rings may be reused indefinitely and it is only necessary to replace the resilient sealing gasket from time to time.

Accordingly, it is a primary object of this invention to provide a filter cartridge featuring an improved mounting and sealing assembly for mounting replaceable filter cartridges within a permanently installed-type relatively smooth-bore cylindrical housing.

Another object of the invention is the provision of a reusable mounting and sealing assembly for use with a series of disposable filter cartridges in mounting the same within a supporting housing.

Another object of the invention is the provision of an improved, low-cost disposable filter cartridge having a readily removable anchoring and sealing assembly.

These and other more specific objects will appear upon reading the following specification and claims and upon considering in connection therewith the attached drawing to which they relate.

Referring now to the drawing in which a preferred embodiment of the invention is illustrated:

Figure 1 is an elevational view with parts broken away showing a filter cartridge incorporating the present invention and installed within an enclosing housing;

Figure 2 is an enlarged fragmentary transverse sectional view showing the filter cartridge anchorage assembly in readiness for clamping in its installed operating position;

Figure 3 is a view similar to Figure 2 but showing the position of parts after the seal has been substantially fully expanded into sealing engagement with the housing wall; and Figure 4 is a fragmentary view taken along line 4—4 on Figure 2 and showing details of the anchorage and weight distributing features of the seal assembly.

Referring to Figure 1, there is shown a separator designated generally 10 having a long, relatively smooth-bore cylindrical housing 11 suitably supported as upon pedestals 12, 12, the opposite ends of housing 11 being provided with radial flanges 13, 13 to which the flanged rims 14 of domed end caps 15 are detachably secured in fluid-tight manner by cap screws 16. The inflowing contaminated liquid enters through a conduit 17 and the filtered fluid is exhausted through conduit 18. Heavier contaminants of the incoming liquid settle into a sump chamber 20 having a normally closed cleaning valve 21. A generally similar sump chamber 23 carried on the under side of the housing at its outlet end serves a similar purpose. Inasmuch as the sump chambers per se form no part of the present invention and are well known in the art, a more detailed description is unnecessary.

The replaceable filter cartridge designated generally 30 comprises an open-ended generally cylindrical shell 31 appreciably smaller in diameter than separator housing 11. Suitably supported and arranged interiorly of shell 31 is filtering material such as excelsior, glass-wool, granular solids, or the like, preferably so disposed as to produce a minimum pressure gradient between the opposite ends of the filter and maximum filtering effectiveness. The filter cartridge is designed for installation from the lefthand end of housing 11 as viewed in Figure 1 and its inner or forward end includes a supporting strut 32, the lower end of which may be rounded to facilitate sliding the filter unit along the inner surface of housing 11. Similar struts may extend radially from the opposite sides of the cartridge to assure centering of its forward end within the separator housing.

The outer end of cartridge shell 31 has fixedly secured thereto as by welding 33 a radial ring 34. This ring has a large diameter opening 35 in its center through which the material to be filtered enters the cartridge. Distributed circumferentially of the ring are two groups of threaded openings 36 and 37. Desirably these openings are of different diameters to seat mating cap screws 38 and 39 respectively, there preferably being an equal number of each alternating with one another circumferentially of the rings. The purpose of these screws will become apparent presently.

The mounting anchorage and sealing assembly designated generally 40 comprises a pair of rings 41 and 42 of identical size and shape. Each is provided with a large diameter central opening 43 similar to opening 35 in ring 34. Likewise each is provided with adjacent beveled surfaces 45 on one outer corner as is made clear by Figures 2 and 3. The two rings are provided with the same number of aligned bores 46 for receiving the non-threaded portions of cap screws 38 and 39, those in inner ring 41 being provided additionally with counter bores 48 to seat the heads of cap screws 38. Screws 38 have hexagonal recesses 49 to seat a similarly shaped wrench. A further difference between rings 41 and 42 concerns the provision in inner ring 41 of a shallow groove 50 on its radial surface seating a resilient gasket 51 providing a fluid-tight seal between rings 34 and 41 when these rings are secured together by cap screws 38.

Secured to the outer radial face of ring 42, as by welding 54, are a plurality of lugs 55 having threaded bores 56 extending radially of the filter cartridge and seating therewithin clamping screws 57 adjustable as necessary to serve multiple purposes including centering of the filter cartridge during installation and removal from housing 11. It will be understood that owing to the weight of the cartridge it is desirable that the cartridge be supported and centered within housing 11 in such manner as to avoid possibility of damage to the resilient packing ring during movement of the cartridge along housing 11. Additionally, cap screws 57 aid in holding the cartridge firmly anchored against axial displacement after the seal has been fully expanded as well as in holding the cartridge centered so that the sealing material does not cold flow under the weight of the cartridge allowing the latter to settle and leading to failure of the seal.

The sealing ring proper preferably comprises an elastomeric O-ring 60 of circular cross-section and of a size relative to the beveled edges 45 of rings 41 and 42 as to occupy the position shown in Figure 2 when rings 41 and 42 are spaced apart. As will be apparent, the tightening of cap screws 39 to force rings 41 and 42 toward one another results in the expansion of sealing ring 60 into the shape illustrated in Figure 3 wherein its outer, generally cylindrical surface 61 presses firmly against the interior side wall of housing 11 and into any imperfections there present. Accordingly, it will be understood that compression applied to the opposite side faces of the ring acts to expand the gasket outwardly placing major portions thereof in hoop tension, and other parts thereof in compression.

To install a new filter cartridge 30 within separator housing 11, it is first necessary to remove end cap 15 from the left-hand end as viewed in Figure 1. The new cartridge with the anchorage and sealing assembly 40 expanded to the position of the parts illustrated in Figure 2 is then slid end-wise into the open end of the housing, the forward end being supported on strut 32 and the centering and locking screws 57 being so adjusted as to permit the rear or coupling end to be supported concentrically of housing 11 by the free ends of these screws. It is important that these screws be so adjusted as to permit free sliding movement of the cartridge along the housing wall without danger of damage to the outer sealing surface of gasket ring 60. In this manner, the cartridge is slid into its desired operating position such as that shown in Figure 1.

Anchor screws 57 are then checked to make certain that the cartridge is substantially centered within the bore of housing 11. Thereafter cap screws 39 are gradually and sequentially tightened in small increments about the clamping ring thereby forcing rings 41 and 42 together in a manner compressing the inner half of gasket 60 and expanding it outwardly into tight sealing engagement with the housing wall as well as into firm sealing engagement with surfaces 45. Figure 3 shows the clamping rings nearly fully compressed together by clamping screws 39, the rings preferably being forced into contact with one another to insure that the outer surface 61 of ring 60 is in wide area contact with the housing wall. Screws 57 are also preferably tightened against the side of housing 11 to supplement the frictional contact between the sealing ring and the housing in holding the cartridge anchored in position and preventing the high pressure existing on the left-hand end of the cartridge from shifting it lengthwise of the separator. Once all the adjustments have been made from the open end of the separator, its end cap 15 is resecured in place thereby restoring the separator to normal operation.

After a period of use the filter will become clogged or in need of servicing. This is accomplished by removing end cap 15, loosening set screws 57 and backing off clamping screws 39 allowing gasket 60 to contract and releasing the cartridge for withdrawal from the separator. Once the cartridge has been removed, outer ring 42 is detached providing access to cap screws 38 holding inner ring 41 assembled to cartridge ring 34. The detached anchorage and sealing assembly 40 is then installed on a new cartridge, care being taken to locate sealing gasket 51 between ring 41 and ring 34 of the new cartridge. The old gasket ring 60 is then replaced along with ring 42 and the new cartridge together with the old anchorage assembly 40 is installed in the separator following the same procedure outlined above. Should the gasket ring be found to have taken a set or to be lacking in resilience, it is a simple matter to replace it with a new one. However, the remainder of the anchorage assembly can be reused for many years and with any number of filter cartridges.

While the particular reusable anchorage and sealing assembly for disposable filter cartridges herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A reusable anchorage and sealing assembly for use with disposable filter cartridges of the type having a cylindrical outer shell having an inwardly projecting radial flange on one rim end thereof, said flange having a plurality of threaded bores arranged circumferentially thereof for the attachment of said anchorage and sealing assembly, said reusable assembly comprising a pair of rings having an outer diameter slightly smaller than the interior diameter of a housing in which said cartridge is to be mounted, an elastomeric gasket ring positioned between said rings and having a relaxed normal diameter substantially that of a housing in which the filter cartridge is adapted to be mounted, means for detachably securing said assembly to the radial flange of said filter cartridge, and means for drawing said rings axially toward one another to compress said gasket and expand the same radially outwardly against said housing to form a fluid-tight seal therewith.

2. The assembly defined in claim 1 characterized in the provision of radially adjustable screw means carried by one of said rings, said screw means being adjustable to hold said filter cartridge approximately centered within an enclosing housing therefor while said cartridge is being installed therewithin, said screw means being thereafter adjustable outwardly into clamping engagement with the interior surface of said housing to hold the cartridge against movement axially thereof by the pressure differential across the filter in the normal operation of the filter.

3. The assembly defined in claim 1 characterized in that the facing outer rim corners of said pair of rings are cut away to provide a generally V-shaped groove for seating said gasket ring and cooperating to expand said gasket ring outwardly as said rings are drawn together to anchor said filter cartridge in its installed position.

References Cited in the file of this patent

UNITED STATES PATENTS

| | | |
|---|---|---|
| 795,444 | Kales | July 25, 1905 |
| 1,568,269 | Cormier | Jan. 5, 1926 |
| 2,649,964 | Taylor | Aug. 25, 1953 |